United States Patent Office 3,829,355
Patented Aug. 13, 1974

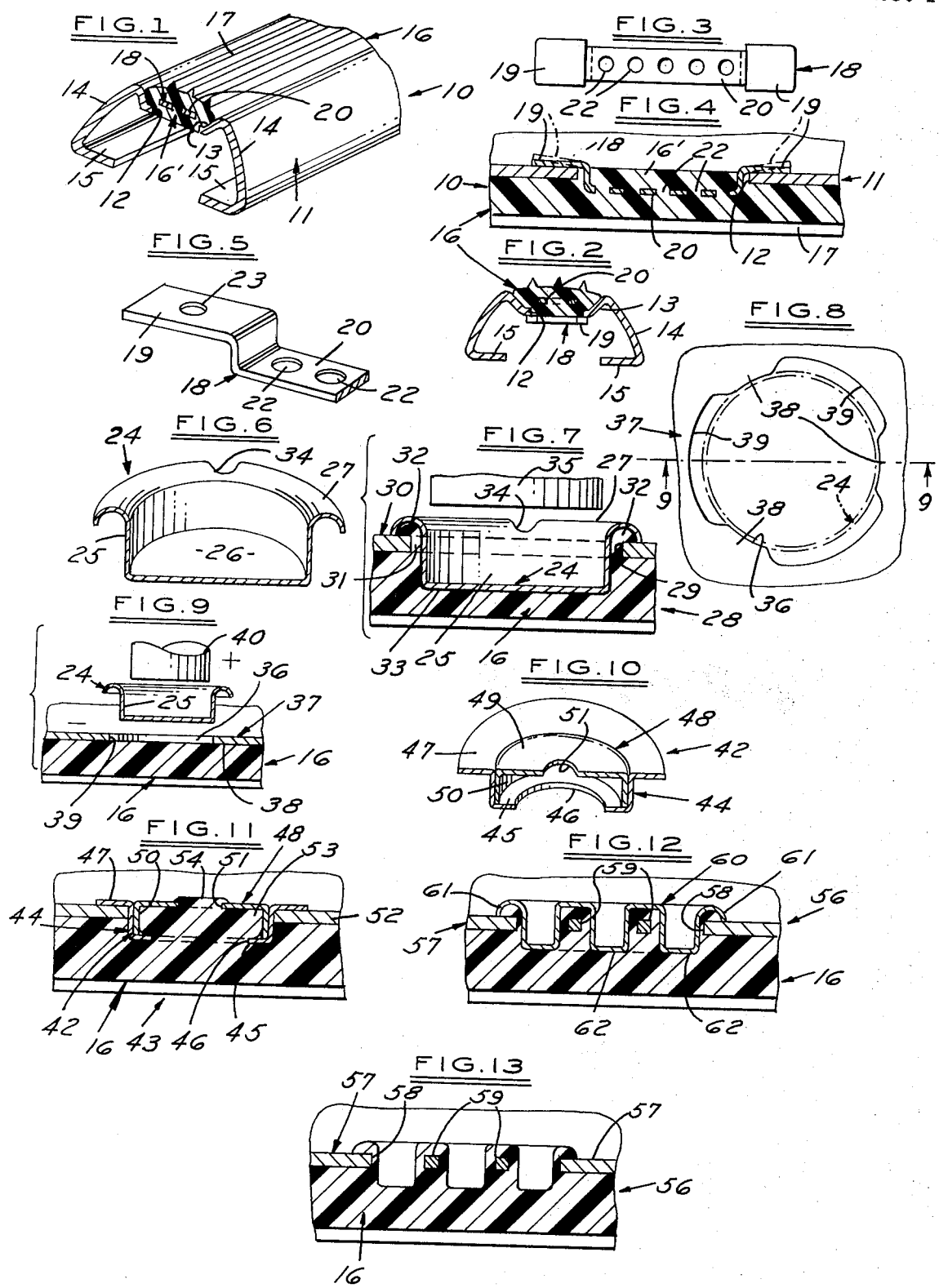

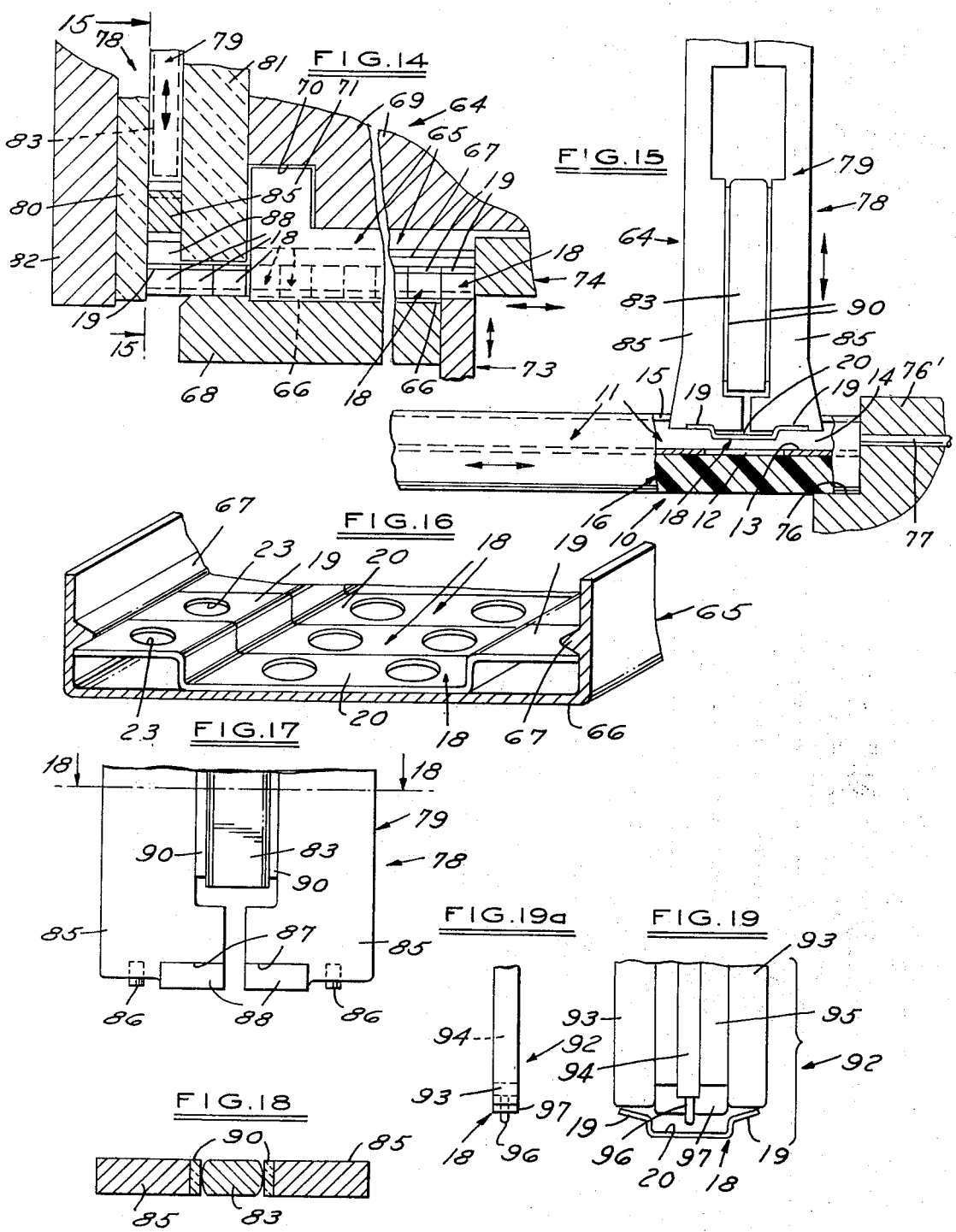

3,829,355
MECHANICAL ATTACHMENT FOR THERMO-
PLASTIC MATERIAL TO A BASE SHEET
Ramon J. Ascencio, Dearborn, Mich., assignor to Douglas
& Lomason Company, Detroit, Mich.
Filed Mar. 8, 1972, Ser. No. 232,855
Int. Cl. B32b 3/10
U.S. Cl. 161—114
20 Claims

ABSTRACT OF THE DISCLOSURE

An interlocked composite finish product includes relatively rigid, apertured metallic base member, a finish strip or sheet of an appropriate thermoplastic composition juxtaposed in relation to the base, and one or more heat-conductive interlocking clips or grommet-like inserts of relatively thin gauge stamped sheet metal each of substantially less area than the base and the strip. In preferred forms the interlock or clip element has an indented, depressed or cupped portion received in an aperture of the base member, with a tab or flange formation of the element overlying a margin of the base aperture, thus engaging a side of that member opposite the surface or side engaged by the thermoplastic finish member. The finish member initially presents a substantially uninterrupted surface engaging flush with the last-named base member side, with the interlock clip or insert element engaging the thermoplastic through the base member's aperture. When said element is heated above the melting point of the thermoplastic material, the latter softens under mild pressure and conducted heat, and extrudes about and/or through said element into a mechanical interlock, when the material has cooled and set, with the base member, in certain instances through the agency of the clip or insert element alone. However, in some contemplated embodiments the element may be removed after thermal displacement and setting of the plastic composition finish material, having served as a form confining the zone of the latter's extrusion.

BACKGROUND OF THE INVENTION (1) Field of the Invention

The product of the invention, as fabricated in accordance with the disclosed method, and preferably by the apparatus, finds wide industrial and commercial application, indeed, in particular in aspects of automotive production involving body or like trim strips, finish sheets, decorative dash and like panelings, etc., in which an attractive composition surface is exposed to view. However, applications in other more or less related fields of production, and in less esthetic settings, are, of course, contemplated.

(2) Description of the Prior Art

A search has revealed as the most pertinent prior art references, among others, patents to Schlabach et al., No. 2,705,346 of Apr. 5, 1955, and Clark, No. 3,514,573 of May 26, 1970. Neither of these shows or suggests a composite assembly of an originally continuous-surfaced thermoplastic finish member with a base member, with an extruded and set interlock of the material of the finish member to the base member being had through the agency of an individual clip or grommet-like insert element.

SUMMARY OF THE INVENTION

The invention affords improved means and methods for producing a composite object of the sort described in the Background in a wide variety of sheet or strip forms. The thermoplastic finish component of the product may be inexpensively extruded, rolled, stamped or otherwise individually fabricated in a number of ways well known in that Art. It is unnecessary to pre-shape subsequently deformed locking buttons or other similar formations projecting from a surface of the plastic finish member; and the relatively rigid base sheet or strip, for example, of stainless steel or aluminum, is produced with comparable ease and relatively low cost in any of various cross-sectional contours. As for the interlocking clip or insert components contemplated by the invention, they are relatively small in size, inexpensively mass-stamped from thin section metal, preferably of a good heat-conductive and resistive nature. The equipment schematically illustrated herein is well adapted for a high speed mass assembly and mechanically interlocked-uniting of the base, finish and insert clip components mentioned above, utilizing a thermoplastic extrusion or displacement principle.

BRIEF DESCRIPTION OF THE DRAWINGS

FIG. 1 is a perspective view of a portion of an elongated type of composite trim strip as produced by the thermoplastic displacement method and apparatus of the invention, using a stamped and pierced interlocking clip element;

FIG. 2 is a view of the strip product as viewed in transverse vertical cross-section at a zone at which the softened plastic enters an aperature of the clip and interlocks mechanically with the latter and a base member of the strip;

FIG. 3 is an enlarged scale top plan view of the stamped and punched clip; per se;

FIG. 4 is a fragmentary view in vertical and longitudinal cross-section in a central longitudinal plane through the center of the completed assembly of FIGS. 1 and 2, the latter being shown inverted 90° to correspond to its position when being assembled, the view also indicating in dotted line a deflected position of end tabs of the clip which may be found desirable for the assembling operation;

FIG. 5 is a fragmentary perspective view, a modified version of the clip of FIG. 3;

FIG. 6 is a fragmentary upper persepctive view of another, cup-shaped type of grommet-like interlock insert pursuant to the invention, as sectioned vertically on the insert's diameter;

FIG. 7 is a view of a portion of a composite assembly featuring the insert of FIG. 6, the view being in section in a longitudinal vertical plane including the axis of the insert, and also showing schematically a typical heating and seating tool for applying the insert;

FIG. 8 is a fragmentary top plan view of base sheet or like member as specially apertured to pilot and mechanically lock in place an insert similar in general to that of FIGS. 6 and 7, a cylindrical outline of the insert appearing in dot-dash line;

FIG. 9 is a view in vertical longitudinal section on a line corresponding to line 9—9 of FIG. 8, schematically illustrating the manner and means for seating the insert in relation to the base member of FIG. 8, and the pre-associated plastic member of the product;

FIG. 10 is a sectional view similar to FIG. 6 of another embodiment of cupped, grommet-type insert member, which is of a force-fitted two-part construction;

FIG. 11 is a fragmentary section corresponding to those of FIGS. 7 and 9, showing the assembly of the interlock insert of FIG. 6 with metal base and thermoplastic components;

FIGS. 12 and 13 are similar vertically sectioned views illustrating a further version of the method and product of the invention, in which the metal base sheet is specially apertured to afford integral bridge portions coplanar with said sheet, a special seating device similar to a clip or insert being employed to confine softened and displaced thermoplastic material for a bonded interlock with and between the bridge portions; the device may be then removed as depicted in FIG. 13;

FIG. 14 is a schematic, longitudinally and vertically sectioned view, partially broken away, of a portion of clip magazine and feed injector-type means contemplated for serially supplying slips in a linear succession of clip-heating and seating head means of apparatus or equipment contemplated by the invention, clip-holding magnet means being indicated in dotted line;

FIG. 15 is another schematic view, partially broken away and in transverse vertical section, as on a line corresponding to line 15—15 of FIG. 14, generally showing the clip-heating and seating as operatively associated with and acting in relation to a sub-assembly of base strip and thermoplastic components of the ultimate product;

FIG. 16 is a fragmentary section in perspective of the clip or insert feed magazine of the apparatus depicted in FIGS. 14 and 15;

FIG. 17 is a fragmentary side elevation in somewhat larger scale of the magnet-equipped heating and seating head;

FIG. 18 is a horizontal cross-section of line 18—18 of FIG. 17; and

FIGS. 19 and 19A are, respectively, fragmentary views in side and end elevation of an alternative and improved form of clip-heating and seating head means contemplated by me.

DESCRIPTION OF A PREFERRED EMBODIMENT

FIGS. 1 through 5 of the drawings illustrate structural features of one type of product according to the invention, typically in the form of an external automobile trim strip; it might, however, be a composite finish strip for other decorative purposes, as on office or household furniture, or the like. This product has a special two-dimensionally contoured cross-sectional outline, but might be simply planar and sheet-like in nature, or in a more or less complex cross-section.

This composite, as generally designated by the reference numeral 10, comprises an elongated extrusion or like form 11 of a suitable gauge steel or aluminum, which has pierced or punched therein a number of through apertures 12 of an elongated rectangular shape. The specific shape, number and spacing of such openings along the length of the base member 11 may vary; however, I find that in a typical installation it suffices to provide them only adjacent opposite ends of the base member, if some type of adhesive is used in the middle sections of relatively long shapes. Assuming it to be of reasonable length, and the later-described plastic member of reasonable stiffness, the clips alone may suffice.

Base member 11 is longitudinally depressed or channeled at 13 along the upper and outwardly exposed portion thereof; and its walls 14 on opposite sides of channel 13 are mildly outwardly convex, terminating at their lower ends in integral inturned longitudinal shoulders 15, at which the finish strip 10 is fixedly applied in a conventional way to whatever surface it is intended to visually complement.

A secondary component of the unit 10 is an elongated, molded or extruded finish member of thermoplastic material, generally designated by the reference numeral 16. By preference, I employ a composition of the vinyl chloride type (hereinafter in some cases referred to as "vinyl"), having appropriate production characteristics, such as its plasticizing and setting temperatures, its appearance and rigidity when set, low cost of production, etc. However, it is to be understood that there exist a large number of comparable organic thermoplastic compounds or compositions which are equally suited to my purpose. Examples are the polyethylenes, ABS (acrylonitrile-butadiene-styrene), acetates, fluorocarbons, polyamides (nylon), polypropylenes, acrylics and cellulosics (cellulose acetate). In most cases this material as embodied in finish member or strip 16 will be opaque and in a color blending or contrasting with the appearance of base member 11. The exposed surface of finish member 16 may also be specially contoured in extrusion or molding, for example, to present projecting parallel rib formations 17.

The composite product assembly 10 is completed, and its components 11 and 16 held in place together, by one or more like clip elements 18; in the embodiment of FIGS. 1–5 these are of an elongated nature, and a typical clip 18 will be, say, 1⅛" in overall length, including a pair of laterally enlarged flange or tab formations 19 at its opposite ends. These are integrally connected to an elongated intermediate indented or recessed portion 20 of one-eighth inch width. In accordance with one mode of installation hereinafter described, it is desirable that the end tabs 19 be angularly bent or offset from the horizontal, as indicated in dotted line in FIG. 4. But as finally installed with the clip 18 interlocked with the material of finish member 16, the tabs 19 lie flush against surface portions of the base member or strip 11. This longitudinal overlap limits transverse movement of clip 18 relative to and in the aperture 12 of the base member in which its indented portion 20 is received, as appears in FIG. 4.

As illustrated in FIGS. 3 and 4, said portion 20 is provided with a plurality of small punched circular or non-circular openings 22 in uniformly spaced relation to one another; an alternative punching of clip 18 may comprise a pair of aligned elongated slots in indented portion 20. The clip embodiment 18 is therefore representative of one general type of clip contemplated by the invention for application per FIGS. 1, 2 and 4, in which the vinyl of base member 16, once thermally plasticized under but slight pressure in the direction transverse of base aperture 12, has extruded or sprued expansively through clip openings 22 in substantial volume, also recombining about the sides of portion 20, then been set to interlock across intervening bridge zones for a mechanical bond of clip 18 with the plastic material and base 11. The accumulation 16' of solidified plastic as a relatively thick flash on one side of the clip is a positive and strong mechanical anchor of member 16 to clip 18, hence with the base; and further adhesive or related interlock means are unnecessary.

FIG. 5 illustrates a slight modification of clip 18 which may be found desirable, in that the end tabs or flange portions 19 may be straight-sided in the same width as the indented portion 20, and have a hole 23 for locating.

FIGS. 6 and 7 generally illustrate another basic, grommet type of insert or interlocking element, in which a volume of the thermoplastic vinyl is thermally and pressure-displaced to form an annular section surrounding the insert itself, marginally overhanging the aperture of the base member in which the insert is nested. The thus thrown up and congealed thermoplastic material has a larger transverse dimension than the projected area of the plastic member from which it was displaced by extrusion.

Such type of insert, generally designated 24, may be circularly cupped in outline, including a cylindrical wall 25 of limited axial depth, which integrally unites with a closure disc part 26 at one axial extremity and at the opposite extremity with an annular, arcuately sectioned extermal flange 27. FIGS. 6 and 7 do not attempt to depict accurate actual dimensions; ordinarily the insert 24 will be proportioned in these respects in diametral and axial ranges generally similar to the proportioning of the interlock clip 18 of FIGS. 1–5, inclusive.

In the production of a composite grommet type sheet or strip assembly such as is generally designated 28 in FIG. 7, the diameter of the aperture 29 in the base member, here generally designated 30, will substantially exceed the outer diameter of insert wall 25, leaving an intervening annular space 31 through which, upon thermal plasticizing to its flow temperature, the vinyl or equivalent material 16 extrudes, displaces or sprues under little pressure to form a mechanical ring or collar-like bond at 32 of the set material with the side of base member 30 engaged by insert flange 27, the latter acting to limit transverse movement of insert 24 as it is being seated.

In using an insert of the cupped or dished sectional outline of FIGS. 6 and 7, or any related type insert not specially apertured (in a manner later referred to by reference to FIGS. 10 and 11), it may be desirable to effect a further direct bond of the thermoplastic material to a non-reentrant surface of the insert, as by the application of a suitable adhesive bonding layer 33 on such surface. Similarly, it may be desirable to marginally notch the flange 27 of insert 24 at one or more places, as indicated at 34, for an outward overflow of melted plastic from the annular interlock collar volume 32 to the exterior of the insert flange. This guarantees a definite and predictable amount of thermoplastic in the overlap zone 32 for optimum interlocking attachment to base member 30. A tool for seating the cupped insert 24 is schematically shown, being generally designated 35; it is contemplated as being a part of insert heating means and as carrying magnetic insert-holding means, as described later in reference to FIGS. 14–18.

In view of this fact that the thermoplasticizing of the vinyl or other base member material will be under heat directly generated resistively in (as through a tool functioning as an electrode) and conducted by the interlocking clip or insert; FIGS. 8 and 9 suggest a further insert modification to facilitate this operation, it deals primarily with the contouring of the insert-receiving aperture, specially designated 36, in the base, sheet, strip or like member, specially generally designated 37. The aperture 36 is punched in a generally but non-regularly circular outline to afford radially inwardly projecting tab or ear portions 38, shown as three in number, which are equally spaced from one another by arcuate bay portions 39 of more substantial circumferential extent. In assembly, per FIG. 9, an insert, such as the cylindrical wall insert 24 of FIG. 6, is force-fitted by a tool 40 into the base member aperture 36, making a good initial electrical contact with the latter at the ear portions 38. This also centers the insert 24 in aperture 36 and establishes an electrical insert-to-base connection through which, with the base member grounded, the plastic material of finish member 16 may be resistively heated to its appropriate melting temperature. The material extrudes through the bay spaces 39 in sufficient volume to afford, when congealed, an adequate and strong mechanical interlock with base sheet 37.

FIGS. 10 and 11 illustrate another attaching grommet insert-type embodiment of the invention, generally designated by the reference numeral 42, which in some respects also corresponds in principle to the clip embodiment 18 of FIGS. 1–5. This is in that, in forming a composite sheet or strip assembly 43 utilizing inserts 42, the plasticized vinyl flows through an opening in the inserted device, mechanically bonding across a portion of an intermediate indentation (or cupped formation) of the inter-lock element. An enlarged head plug or rivet portion of the set vinyl affords a very strong interlock.

Thus, as viewed in FIGS. 10 and 11, the insert 42 is of a two-part nature, comprising a cylindrical-walled outer body part 44 defined at one axial extremity at an integral radially inward shoulder or flange 45 surrounding a circular opening 46 of considerable diameter. At its opposite axial extremity, insert wall 44 is integrally joined at 90° by a radially outwardly extending annular flange 47. A supplemental internal insert element 48 of inverted cup shape includes a disc-like horizontal portion 49 integrally carrying an annular, 90° offset wall portion 50, which has a force fit within the wall of the outer insert element 44. Disc portion 49 of this supplemental element is centrally apertured at 51.

With the two-part grommet insert 42 nested with a close tolerance fit in an aperture in a base member 52, the plasticized material of finish member 16 flows in a relatively large volume thereof through insert opening 46 to afford a large integral interlocking plug or rivet portion 53, which when solidified cannot come free of the insert shoulder or flange 45. An excess 54 of the material also flows through the opening 51 of the secondary insert element 48, thus establishing an additional mechanical interlock, when set, of the thermoplastic, insert and base with one another, also insuring a full complement of plastic material in the main plug portion 53.

In the insert or clip embodiment of the invention thus far described, the interlock insert or clip in all instances remains as a unitary part of the composite sheet or strip assembly. FIGS. 12 and 13, however, show another embodiment in which a mechanical plastic-to-base member bond is effected solely through the agency of the base and finish members themselves, a clip or insert-like element primarily serving the function of a confining form. As such, it may be removed (FIG. 13) when the formed interlock material has jelled, or may be left in place; should it be later dislodged, no particular harm is done.

In accordance with this composite embodiment, generally designated by the reference numeral 56, the base member, generally designated 57, is punched at an aperture area 58 thereof to provide a plurality of individual openings, circular or non-circular, separated from one another by transverse bridge formations 59 integral with and in the plane of base member 57.

A forming insert element, specially designated 60, is externally contoured in an outline and size to nest with fairly good clearance in the base aperture area 58, outer flanges 61 of member 60 overlapping and engaging the member 57 externally of the latter's aperture; and alternating box-section indented formations 62 of insert element 60 fit with generous tolerance in the sub-openings between bridge elements 59. Upon plasticizing of the finish member material under heat conducted through element 60, the plastic extrudes between the insert formations 62, displacing upwardly and over the cross bridge pieces 59. Upon set of the extruded material, element 60 may be stripped away from the base sheet member 57, leaving, as illustrated in FIG. 13, an integral interlock of plastic material over bridges 59 and marginally over the base member aperture 58. But, as in other embodiments, the insert may be left in place as a further stiffening interlock.

In reference to the apparatus or equipment, as illustrated in FIGS. 14–18, inclusive, and generally designated in FIGS. 14 and 15 by the reference numeral 64, by which clip or insert interlock members are seated in relation to the base sheet or strip and the finish component, it will be assumed that said member is an elongated clip type such as is illustrated in FIGS. 1 through 6, the base 11 being shaped in cross-section and apertured in the manner of base member 11 of FIGS. 1, 2 and 4. However, it is, of course, contemplated that other types of clip or insert member may be supplied and seated in the same fashion.

As very schematically illustrated in FIGS. 14–18, a typical such apparatus 64 comprises a horizontally elongated magazine 65 of relatively flexible nature, generally U-shaped in transverse vertical section, which may be extruded or molded of an appropriate material, such as a polyethylene composition. Magazine 65 has a horizontal floor 66 along which a succession of the pre-stamped and punched clips 18 are serially advanced in front-to-rear engagement with one another; and the upright walls of magazine 65 may be shaped to afford inwardly projecting parallel guide and/or restraining ledges 67, beneath which the tab or flange elements 19 of the clips are confined. However, such restraining guide means are not essential to the construction.

As appears in FIG. 14, the magazine 65 is stably supported upon a horizontal base portion 68 of equipment 64, being held down from above by another base unit 69; and the latter has a forward upper recess 70, in which integral upright ears 71 of the walls of magazine 65 are registered.

Just to the rear of magazine support base 68 a magazine loading plunger 73 is positioned, being operated by suitable means (not shown) for periodic vertical reciprocation, as indicated by the lower double-headed upright arrow in FIG. 14, the timing of its stroke being controlled by appropriate electrical means and circuitry constituting no part of the invention. The function of the magazine load plunger 73 is to pick up individual clips 18 from a feed-in zone beneath magazine 65, the member 73 being suitably top-contoured for this purpose, and raise such clips individually to the elevation just a bit above the magazine floor 66. At this time the elevated clip 18 is engaged from its rear by a horizontally acting feed or injector member 74, causing the succession of clips 18 to be advanced horizontally a distance approximating the width of one thereof. The forward end-most clip 18 is thus brought to a seating zone or area which is in vertical register with an aperture 12 of the base member 11 of the composite strip length 10.

FIG. 15 depicts this strip unit as having been pre-assembled as to its base member 11 and thermoplastic finish member 16, with this sub-assembly inverted 90° and the base 11 on top, just as depicted in FIG. 4. Appropriate means (not shown) will be provided to end-position the sub-assembly of base and finishing member sub-assembly, as with a forward end thereof supported in a notched confining recess 76 of a fixed base part 77 of the equipment 64, An operator element 76' of a sensitive microswitch (otherwise not shown) may be movably mounted at 77 to shift responsively when tripped by the thus positioned strip sub-assembly, thereby initiating the operation and energization of the clip heating and seating means of the equipment. This clip positioning and seating portion of the apparatus is generally designated by the reference numeral 78.

It further includes a vertically elongated, upright seating head 79, which as indicated by the upper double-headed arrow in FIG. 14, is guided for periodic reciprocatory action between upright anti-friction, and thermally and electrically insulative, parts 80, 81 of Teflon or the like. These are spaced from one another sufficiently for a reasonably close sliding fit therebetween of the heating and seating head 79. An outer upright wall member 82 of apparatus 64 laterally confines the guide part 80; and a permanent magnet 83 constitutes a part (later described further) of head 79, exerting a tractive force upon the leading one of the succession of clips 18, assuming them to be of a magnetic metal.

FIGS. 17 and 18, as considered with FIG. 15, illustrate in more detail the arrangement of parts of the heating and seating head 79. As contemplated by me, it comprises a transversely aligned and spaced pair of plate-like copper electrode members 85, relatively thin in section, which may optionally be equipped at the respective bottoms therof with alignment pins 86; these may engage in the tab holes 23 (FIG. 5) adjacent the ends of a clip, magnetically picked up and held by seating head 79, to prevent accidental lateral shift of the clip. Inwardly of such optional elements the bottoms of the electrodes 85 are similarly recessed at 87 to receive identical Teflon-coated fiberglass blocks 88; these will matingly engage in the centrally depressed portion 20 of a clip 18, as the latter has been located by feed injector part 74 (per FIG. 14), i.e., in vertical register in the path of action of seating head 79, and with the seating area or zone directly therebeneath.

Thus, upon a downward stroke of head 79 the latter engages said clip 18 at its tab 19 and causes the magnetically held clip to be displaced downwardly into operative seating registration over the base member aperture 12, as indicated in FIG. 15. The Teflon or equivalent block elements 88 are electrically non-conductive, and also will well withstand the heat of the plasticized finish material which may contact them.

The vertically acting magnet 83 (which may also be considered to be a solenoid armature in a head 79 operated by such type electrical means) is mounted in fixed coplanar relation to and between the electrodes 85 of the head, being separated therefrom by elongated and fixed insulating mica or Bakelite strips 90. Thus, upon engagement of head 79 with a clip 18 from above, the latter will thereafter be magnetically held to the lower head portion in the field of magnet 83, until seating is completed.

Vertical travel of head 79 in either direction may be imparted thereto by conventional air cylinder means (not shown) or by reversing solenoid means as also suggested. In operation, as magnetically picked up and shifted downwardly by head 79, a clip is brought to a halt at a spacing of, say, $\frac{1}{10}''$ above the base member aperture 12, where the clip is operatively positioned in proper register with member 11. Electrodes 83 are thereupon electrically energized by appropriate circuitry (not shown) and, as contacted with and above the clip tabs 19, cause the clip 18 to be resistance-heated to a momentary temperature of approximately 600° F. The operating air cylinder is then disabled (or a solenoid de-energized), allowing seating head 79 to nest the heated clip 18 under the weight of the head alone, or by an additional imposition of force, if desired, within base member aperture 12. The consequent thermally conductive plasticization of the material of finish member 16 under such mild pressure seats the clip fully into the material. After a sufficient time interval for fusion extrusion flow in relation to the clip 18, as illustrated in FIGS. 1 and 4, a blast of air may be directed onto the embedded clip seat zone to cool the embedding vinyl, whereupon seating head 79 is again moved vertically upwardly to a starting position.

An alternate method is to move the head with clip to its down position against the member 16, and apply the pressure or weight before inducing the heating current to the clip. Beginning with and continuing during the heating cycle, movement of the clip into plastic 16 occurs.

FIGS. 19 and 19A illustrate a seating head construction, generally designated by the reference numeral 92, which evolved as an improvement over the arrangement 78 of FIGS. 14–18. The head 92 includes a pair of copper electrodes 93 similar to those of the equipment 64; and a magnet 94, as embedded in a Bakelite body 95, is fixed between the electrodes 93. Head 92 is reciprocatingly operated in the manner of head 79.

Magnet 94 carries a vertically depending pin 96 which is housed within a Teflon-coated fiber glass block part 97, the latter shaped to partially nest within the indentation or depression 20 of a clip 18, and the pin 96 will engage downwardly against an unperforated part of clip portion 20. It thus holds the clip 18 against racking distortion under heat applied thereto, as plasticization of the finish member material proceeds and clip 18 is seated therein.

By preference, the tab or flange elements 19 of the magnetically sustained clip 18 are initially bent upwardly a trifle, as also suggested in FIG. 4, so that, under approximately five pounds force on the head 92, gravitational or otherwise, these tabs will be then bent downwardly in flush engagement with the base member surfaces at 19, where they remain while the clip 18 is heated, and the thermoplastic material caused to seat and mechanically interlock with the clip and base member.

It is to be clearly understood that in the claims to follow the term "insert" is to be construed in a generic breadth of scope to encompass interlock elements as disclosed in all embodiments of the invention, whether elongated rivet or grommet-like, or other equivalents as to shape, unless another interpretation is in order by reason of clearly expressed structural limitation.

What is claimed is:

1. A strip or sheet-like composite product comprising a relatively rigid insert member, a similarly relatively rigid base member having an aperture with which said insert member is in transverse register, said insert member being structurally distinct from and of substantially less area than the base member and having a part engaged with a portion of said base member to limit transverse relative movement of the insert and base members in reference to said aperture, and a finish member of normally solid thermoplastic material in juxtaposed relation to said base member on the side of the latter opposite that engaged by said insert part, said base and insert members being of substantially greater heat resistivity than said finish member and there being at least a portion of an area within the limit of said base member aperture at which said finish member material as thermoplasticized has extruded, set and interlocked itself as engaged with said opposite side of the base member, said finish member material thereby constituting an essential agency in mechanically uniting said insert and base members as components of said composite product.

2. A strip or sheet-like composite product comprising a relatively rigid insert member, a similarly relatively rigid base member having an aperture in which said insert member is nestingly received, said insert member being structurally distinct from and of substantially less area than the base member and having a laterally extending part engaged with a portion of said base member to limit transverse relative movement of the insert and base members in reference to said aperture, and a finish member of normally solid thermoplastic material in juxtaposed relation to said base member on the side of the latter opposite that engaged by said insert part, said base and insert members being of substantially greater heat resistivity than said finish member and there being at least a portion of an area within the limit of said base member aperture at which said finish member material as thermoplasticized has extruded, set and interlocked itself as engaged with said opposite side of said last named side of the base member, said finish member material thereby constituting an essential agency in mechanically uniting said insert and base members as components of said composite product.

3. The product of Claim 1, in which said insert member has an elongated indented formation at which it is received in said aperture of the base member, said insert part being a flanged element extending laterally outwardly of said formation.

4. The product of claim 2, in which said insert member has an annular cup formation at which it nests into said aperture of the base member, said insert part being a flanged element extending laterally outwardly of said formation.

5. The product of claim 1, in which said insert member has an elongated indented formation at which it is received in said aperture of the base member, said formation being apertured to receive extruded material, said insert part being a flanged element extending laterally outwardly of said formation.

6. The product of Claim 2, in which said insert member has an annular cup formation at which it nests into said aperture of the base member, the base member aperture having annularly spaced portions piloting said cup formation in so nesting.

7. The product of claim 3, in which said insert has an opening therein affording said area portion through which said finish member material has extruded and set.

8. The product of Claim 4, in which said insert has an opening within said annular cup formation thereof affording said area portion through which said finish member material has extruded and set.

9. The product of Claim 7, in which said insert is an elongated, strip-like one having a flange ear at an end outward of said indented formation thereof, the latter also being elongated and carrying an opening representing said area portion.

10. The product of Claim 4, in which said area portion is an annular one between said cup formation of the insert and the margin of said base member aperture.

11. The product of Claim 6, in which said area portion is an annular one between said cup formation of the insert and the margin of said base member aperture.

12. The product of Claim 4, in which said cup formation has nested in fixed position therein another element provided with an opening through which the set finish member material interlocks with said other element.

13. The product of Claim 6, in which said cup formation has nested in fixed position therein another element provided with an opening through which the set finish member material interlocks with said other element.

14. The product of Claim 8, in which said cup formation has nested in fixed position therein another element provided with an opening through which the set finish member material interlocks with said other element.

15. The product of Claim 1 as an intermediate one, from which the insert may be removed after setting of said thermoplastic material.

16. The product of Claim 2 as an intermediate one, from which the insert may be removed after setting of said thermoplastic material.

17. The product of Claim 1 as an intermediate one, from which the insert may be removed after setting of said thermoplastic material, said base member having an integral transverse element within said aperture thereof with which the set material is interlocked.

18. The product of Claim 2 as an intermediate one, from which the insert may be removed after setting of said thermoplastic material, said base member having an integral transverse element within said aperture thereof with which the set material is interlocked.

19. A strip or sheet-like composite product comprising a metallic base member, a metallic insert member structurally distinct from said base member, said base member having an aperture with which said insert member is in transverse register, said insert member being of substantially less area than the base member and having a part engaged with a portion of said base member to one side of the latter to limit transverse relative movement of the insert and base members in reference to said aperture, and a finish member of non-metallic plasticizable resinous material in juxtaposed relation to said base member on the side of the latter opposite said one side engaged by said insert part, said base and insert members being of substantially greater heat resistivity than said finish member and there being at least a portion of an area within the limit of said base member aperture at which said finish member material after being plasticized and set is interlocked with the base member as engaged with said opposite side of the latter, said finish member material thereby constituting an essential agency in mechanically uniting said insert and base members as components of said composite product.

20. A strip or sheet-like composite product comprising a metallic base member, a metallic insert member struturally distinct from said base member, said base member having an aperture in which said insert member is nestingly received, said insert member being of substantially less area than the base member and having a laterally extending part engaged with a portion of said base member to one side of the latter to limit transverse relative movement of the insert and base members in reference to said aperture, and a finish member of non-metallic plasticizable resinous material in juxtaposed relation to said base member on the side of the latter opposite said one side engaged by said insert part, said base and insert members being of substantially greater heat resistivity than said finish member and there being at least a portion of an area within the limit of said base member aperture at which said finish member material after being plasticized and set is interlocked with said opposite side of the base member, said finish member material thereby constituting an essential agency in mechanically uniting said insert and base members as components of said composite product.

References Cited

UNITED STATES PATENTS

| | | | |
|---|---|---|---|
| 2,705,346 | 5/1955 | Schlabach et al. | 18—59 |
| 3,507,739 | 5/1970 | Jacobs | 161—114 |
| 3,277,823 | 10/1966 | Redding | 101—401.1 |
| 3,634,178 | 1/1972 | Goodman | 161—7 |
| 3,709,770 | 1/1973 | Hale | 161—44 |
| 3,461,545 | 8/1969 | Bush | 29—509 |
| 3,514,573 | 5/1970 | Clark | 219—150 |
| 3,680,903 | 8/1972 | Hulten | 52—716 |
| 3,448,550 | 6/1969 | Herr et al. | 52—717 |

HAROLD ANSHER, Primary Examiner

W. R. DIXON, Jr., Assistant Examiner

U.S. Cl. X.R.

161—119, 138; 293—62, Dig. 4